(12) United States Patent
Kitazawa et al.

(10) Patent No.: US 6,433,447 B1
(45) Date of Patent: Aug. 13, 2002

(54) LINEAR/ROTARY ACTUATOR

(75) Inventors: Kazuyuki Kitazawa; Yutaka Takeuchi, both of Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 71 days.

(21) Appl. No.: 09/676,833

(22) Filed: Sep. 29, 2000

(30) Foreign Application Priority Data

Sep. 30, 1999 (JP) .......................................... 11-278618

(51) Int. Cl.[7] .......................... H02K 41/00; H02K 7/20
(52) U.S. Cl. .......................................... 310/12; 310/20
(58) Field of Search .............................. 310/12, 13, 14, 310/20, 80

(56) References Cited

U.S. PATENT DOCUMENTS 6,081,051 A 6/2000 Kitazawa et al. ............. 310/20

FOREIGN PATENT DOCUMENTS

| JP | 05296308 | 11/1993 |
| JP | 06292343 | 10/1994 |

*Primary Examiner*—Nestor Ramirez
*Assistant Examiner*—Judson H. Jones
(74) *Attorney, Agent, or Firm*—Rankin, Hill, Porter & Clark LLP

(57) ABSTRACT

A linear/rotary actuator capable of carrying out linear motion at a high speed. A linear motor is used as a linear driving motor. The linear motor has a linear shaft connected to an output shaft of a rotary driving motor through an intermediate bearing structure. The output shaft of the rotary driving motor is provided with a forward spline section. A nut fitted on the forward spline section is fixed in a revolving shaft supported on a forward bearing structure. The output shaft is formed on a rearward portion thereof with a rearward spline section. The portion of the output shaft on which the rearward spline section is formed is slidably and rotatably supported.

13 Claims, 4 Drawing Sheets

LINEAR/ROTARY ACTUATOR

BACKGROUND OF THE INVENTION

This invention relates to a linear/rotary actuator, and more particularly to a linear/rotary actuator for actuating a machine or an equipment such as an arm of a robot, a nozzle for a winding machine or the like which carries out both linear motion and rotary motion.

Driving of a machine or an equipment such as, for example, an arm of a robot, a nozzle of a winding machine or the like often requires an actuator which is constructed so as to carry out linear motion and rotary motion not only individually (linear/rotary uniaxial motion) but concurrently (linear/rotary biaxial motion). Actuators for such biaxial motion include two types of actuators. One of them is a linear/rotary actuator of the type that simply an actuator for linear motion and that for rotary motion are combined with each other. More particularly, the actuator is so constructed that a rotary driving motor and a linear driving motor are independently arranged so as to transmit power through a complicated transmission mechanism to a single output shaft to carry out rotary/linear biaxial motion. The other actuator is a linear/rotary actuator of the type that a rotary driving motor and a linear driving motor are linearly arranged so as to directly carry out either rotary driving of an output shaft or linear driving thereof without using any complicated transmission mechanism. The actuator of the latter type is disclosed in, for example, Japanese Patent Application Laid-Open Publication No. 296308/1993, wherein two motors linearly arranged in juxtaposition to each other so as to define an axis of the actuator by cooperation with each other permit a single output shaft to carry out linear/rotary biaxial motion. Both former and latter linear/rotary actuators are disclosed in Japanese Patent,Application Laid-Open Publication No. 292343/1994.

The linear/rotary actuator disclosed in Japanese Patent Application Laid-Open Publication No. 292343/1994 is constructed in such a manner that a single output shaft is formed with both a ball screw and a spline. The ball screw and spline are driven either through a transmission mechanism or directly by means of both a rotary driving motor and a linear driving motor. Unfortunately, such construction of the linear/rotary actuator disclosed causes a problem that the output shaft carries out linear motion with rotation of a rotor of the rotary driving motor when a rotor of the linear driving motor is kept interrupted during rotary motion. In order to solve the problem, it is required to control the linear driving motor in coordination with the rotary driving motor during rotation thereof. This renders control of both rotary and linear driving motors highly troublesome and complicated and leads to both a failure in control and misregistration in control.

Also, the above-described latter linear/rotary actuator disclosed in Japanese Patent Application Laid-Open Publication No. 296308/1993 is so constructed that the single output shaft described above is adapted to carry out both rotary motion and linear motion and formed with a ball screw and a spline. The ball screw is threadedly engaged with a nut driven for rotation through the linear driving motor and the spline is linearly movably fitted in a groove of a shaft driven for rotation through the rotary driving motor. Driving of the linear driving motor rotates the nut, leading to linear motion of the output shaft, whereas driving of the rotary driving motor leads to rotation of the output shaft through the shaft. Such construction of the linear/rotary actuator permits it to be relatively simplified in structure and reduced in whole size. However, the linear/rotary actuator causes linear motion and rotary motion to be mechanically synchronized with each other, to thereby fail to individually carry out linear motion and rotary motion. For example, it fails in execution of only rotary motion, because the ball screw is rotated relatively to the nut, to thereby fail to rotate the output shaft while holding it against linear motion. Likewise, it fails to concurrently carry out both linear motion and rotary motion because it ensures linear motion in only one direction but causes a reduction in speed of linear motion in the other direction or fails in linear motion in the other direction. Such a restriction fails to permit the linear/rotary actuator to satisfactorily exhibit general-purpose properties.

In addition, the conventional linear/rotary actuator fails to optionally and positively carry out linear motion and rotary motion, leading to a failure to permit so-called box motion (linear motion, rotation, linear motion and rotation) as required in operation of a nozzle of a winding machine to be repeatedly executed at an increased speed.

SUMMARY OF THE INVENTION

The present invention has been made in view of the foregoing disadvantage of the prior art.

Accordingly, it is an object of the present invention to provide. a linear/rotary actuator which is capable of simply and positively attaining linear motion and rotary motion either concurrently or individually while arranging a rotary driving motor and a linear driving motor in a manner to be coaxial with each other.

It is another object of the present invention to provide a linear/rotary actuator which is capable of being constructed into a simplified and compact structure.

The present invention relates to an improvement in a linear/rotary actuator including a linear motor which is described in U.S. Pat. No. 6,081,051 (U.S. Ser. No. 09/212, 030) assigned to the assignee, the disclosure of which is hereby incorporated by reference herein. Thus, in accordance with the present invention, a linear/rotary actuator is provided. The linear/rotary actuator includes a linear motor including a hollow linear shaft acting as a movable element and an output shaft formed on forward and rearward portions thereof with forward and rearward spline sections each having a predetermined length, respectively. The output shaft has an intermediate portion on which the forward and rearward spline sections are not formed. The intermediate portion of the output shaft is rotatably inserted through the linear shaft by means of an intermediate bearing structure. The linear/rotary actuator also includes a nut fitted on the forward spline section of the output shaft, a rotary driving motor for rotating the nut either directly or through a transmission mechanism, to thereby rotate the output shaft, and a rearward bearing structure including a fixed section having the rearward spline section fixed thereto. The rearward bearing structure supports the rearward spline section so as to permit sliding of the rearward spline section in an axial direction of the actuator and rotation of the output shaft. Arrangement of the rearward bearing structure permits the output shaft to be supported in a dual-support manner, to thereby significantly reduce generation of vibration. In order to rotate the output shaft through driving of the rotary driving motor, the output shaft is provided thereon with the front and rear spline sections and the nut fitted on the forward spline section is directly rotated, so that the output shaft may be rotated through the rotary driving motor. Alternatively, the nut may be rotated through a transmission mechanism to drive the output shaft through the rotary driving motor.

The term "spline section" referred to herein means a mechanism or structure which permits movement of a shaft in an axial direction thereof. The forward spline section described above is fitted thereon with a nut called a spline nut. The forward spline section keeps the shaft from being rotated when the spline nut is kept locked or fixed. When the nut is rotated due to application of force for rotation thereto while being kept unfixed, the forward spline section functions to transmit the force to the shaft. The rearward spline section formed on a rearward portion of the output shaft does not have any nut for transmission of force for rotation fitted thereon. The rearward spline section is fixed to the fixed section of the linear/rotary actuator and supported on the rearward bearing structure which permits sliding of the rearward spline section in the axial direction and rotation of the output shaft. The forward spline section and rearward spline section each may be configured in the form of either a groove or a projection which extends in the axial direction. The nut fitted on the forward spline section is engaged with the forward spline section, so that rotation thereof around the shaft may be prevented.

In accordance with this aspect of the present invention, a linear/rotary actuator is provided. The linear/rotary actuator includes a linear motor including a stator fixed on a frame and a hollow linear shaft acting as a movable element and an output shaft formed on forward and rearward portions thereof with forward and rearward spline sections each having a predetermined length, respectively. The output shaft has an intermediate portion on which the forward and rearward spline sections are not formed. The intermediate portion of the output shaft is rotatably inserted through the linear shaft by means of an intermediate bearing structure. The linear/rotary actuator also includes a nut fitted on the forward spline section of the output shaft and constructed so as to permit sliding of the forward spline section in an axial direction of the actuator; a rotary driving motor including a revolving shaft configured into a hollow structure and having the nut fixed therein, a rotor fixed on said revolving shaft and a stator fixed on said frame; a forward bearing structure for rotatably supporting the revolving shaft on the frame; and a rearward bearing structure including a fixed section fixed on the frame, an outer ring fixed on the fixed section and an inner ring fitted on the rearward spline section so as to permit sliding of the rearward spline section in the axial direction.

The linear driving motor for driving the linear shaft is constituted by a linear motor and directly uses the linear shaft as a movable element for the linear motor. Any suitable motor may be used as the rotary driving motor. However, a servomotor or a step motor may be suitably used in order to enhance controllability of the linear driving motor. When the linear motor is used for this purpose, the revolving shaft of the rotary driving motor is configured into a hollow structure, the linear shaft is constituted by the movable element of the linear motor, and the linear shaft is formed into a length which permits it to extend through a central portion of the revolving shaft of the rotary driving motor so that the output shaft may be arranged in a manner to be rotatable with respect to the linear shaft. The revolving shaft of the rotary driving motor has the nut fixed thereon and fitted on the forward spline section provided on the output shaft.

In the present invention, as described above, the linear motor is used as the linear driving motor, to thereby directly drive the linear shaft without any spline means or threaded means, resulting in the linear/rotary actuator being highly simplified in structure. In particular, when the linear motor which includes the hollow linear shaft acting as the movable element is used and the output shaft is rotatably inserted through the linear shaft by means of the intermediate bearing structure, the linear/rotary actuator of the present invention may be configured in a compact manner.

Also, the linear/rotary actuator of the present invention may include at least one detent mechanism arranged between the linear shaft of the linear motor and the fixed section so as to prevent rotation of the linear shaft about the output shaft. This effectively reduces generation of vibration from the linear shaft. A plurality of such detent mechanisms may be arranged so as to be spaced from each other at equal intervals in a direction of rotation of the output shaft.

The rearward bearing structure may be fixed to the fixed section arranged on a rearward side of the linear shaft. In this instance, the detent mechanism may include an elongated bar-like member fixed to the linear shaft so as to rearwardly extend therefrom and a guide member provided on the fixed section and fitted on the bar-like member. The guide member may be configured to permit sliding of the bar-like member in the axial direction but prevent rotation of the bar-like member about the output shaft.

The linear/rotary actuator may further include a position sensor for detecting a position of a rearward end of the bar-like member. This facilitates detection of a position of an origin of the output shaft, to thereby facilitate positional control of the output shaft in a direction of linear motion thereof.

In order to more forwardly arrange the rear bearing structure, the linear/rotary actuator of the present invention may be constructed in such a manner that the fixed section may be constituted by a fixed section body arranged on the rearward portion of the linear shaft and a cylindrical member fixed at a rearward portion thereof to the fixed section body and arranged concentrically with the linear shaft and output shaft so as to forwardly extend between the linear shaft and the output shaft, the rearward bearing structure is fixed on a forward end of the cylindrical member, and the detent mechanism includes an elongated bar-like member fixed to the fixed section body so as to forwardly extend therefrom and a guide member provided on the linear shaft and fitted on the bar-like member, wherein the guide member is configured to permit sliding of the linear shaft in the axial direction but prevent rotation of the linear shaft about the output shaft. Also, the cylindrical member may be formed into a length which permits the intermediate bearing structure and rearward bearing structure to be arranged in proximity to each other. Such configuration reduces a distance between the intermediate bearing structure and the rearward bearing structure and permits the rearward bearing structure to be arranged in the linear shaft, resulting in a length of the output shaft being decreased, so that the linear/rotary actuator may be significantly reduced in whole length and constructed in a compact manner.

The above-described construction of the linear/rotary actuator of the present invention not only permits linear motion of the linear shaft in the axial direction upon driving of the linear motor, but permits the output shaft to carry out linear motion with the that of the linear shaft. The output shaft is inserted through the linear shaft by means of the intermediate bearing structure, so that rotation of the output shaft does not lead to rotation of the linear shaft. Whereas, when the rotary driving motor is driven to rotate the output shaft, the output shaft may carry out linear motion while carrying out rotary motion because the nut provided in the revolving shaft of the rotary driving motor is fitted on the spline section of the output shaft. The linear shaft may be constructed into a hollow structure and the output shaft may have an intermediate portion on which the forward and rearward spline sections are not formed, so that the intermediate portion of the output shaft may be rotatably inserted through the linear shaft by means of the intermediate bearing structure. In other words, the output shaft is rotatably inserted through the linear shaft by means of the intermediate bearing structure while being concentric with the linear shaft. Such construction permits linear motion of the output shaft with that of the linear shaft but prevents rotation of the linear shaft irrespective of rotation of the output shaft. This permits rotation of only the output shaft at a predetermined position and control of rotation of the output shaft in asynchronism with the linear motion, so that the linear/rotary actuator may exhibit excellent general-purpose properties and be simplified in structure. Synchronism between the linear motion and the rotary motion may be attained by rendering both motions electrically synchronous with each other depending on outputs of rotation detectors or encoders mounted on the linear driving motor and rotary driving motor, respectively.

The rotary driving motor may be constructed so as to rotate the nut fitted on the spline section provided on the output shaft through a transmission mechanism such as a reduction mechanism or the like, to thereby rotate the output shaft.

Further, in accordance with this aspect of the present invention, a linear/rotary actuator is provided. The linear/rotary actuator includes a linear motor including a stator fixed on a frame and a hollow linear shaft acting as a movable element and an output shaft formed on forward and rearward portions thereof with forward and rearward spline sections each having a predetermined length, respectively. The output shaft has an intermediate portion on which the forward and rearward spline sections are not formed. The intermediate portion of the output shaft is rotatably inserted through the linear shaft by means of an intermediate bearing structure. The linear/rotary actuator also includes a nut fitted on the forward spline section of the output shaft and constructed so as to permit sliding of the forward spline section in an axial direction of the actuator; a rotary driving motor including a revolving shaft configured into a hollow structure and having the output shaft inserted therethrough, a rotor fixed on the revolving shaft and a stator fixed on the frame; a reduction mechanism arranged between the revolving shaft and the nut to transmit rotation of the revolving shaft to the nut while reducing a speed of rotation of the revolving shaft; a forward bearing structure for rotatably supporting the revolving shaft on the frame; and a rearward bearing structure including a fixed section fixed on the frame, an outer ring fixed on the fixed section and an inner ring fitted on the rearward spline section so as to permit sliding of the rearward spline section in the axial direction. The reduction mechanism may be constituted by an epicyclic gear mechanism including a rotator, which includes a central gear provided on the revolving shaft and epicyclic gears fixed on the rotator so as to be rotated about the central gear. The rotator may be coupled to the nut and rotatably supported on the frame through a bearing structure. Arrangement of the thus-constructed reduction mechanism facilitates control of rotary motion of the linear/ rotary actuator and permits the actuator to positively carry out rotary motion at high torque even when a miniature motor is used.

The linear/rotary actuator may also include an electromagnetic brake mechanism including exciting coils and arranged between the rotary driving motor and the reduction mechanism. The electromagnetic brake mechanism carries out non-braking operation when the exciting coils are kept excited and braking operation when the exciting coils are kept non-excited. The exciting coils are rendered non-excited when feeding of electricity to the rotary driving motor is interrupted. Arrangement of the electromagnetic brake mechanism permits the brake mechanism to carry out operation when feeding to the rotary driving motor is kept interrupted, to thereby prevent occurrence of any accident due to rotation of the output shaft during non-excitation of the exciting coils. Further, the linear/rotary actuator of the present invention may further include a spring mechanism for constantly applying, to the output shaft, force which rearwardly moves the output shaft. The spring mechanism upwardly pushes the output shaft, to thereby prevent occurrence of an accident due to excessive lowering of the output shaft, even when a power failure occurs in the case that the actuator is operated while keeping the output shaft downwardly extending.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a linear/rotary actuator according to the present invention will be described hereinafter with reference to the accompanying drawings.

Figure 1:
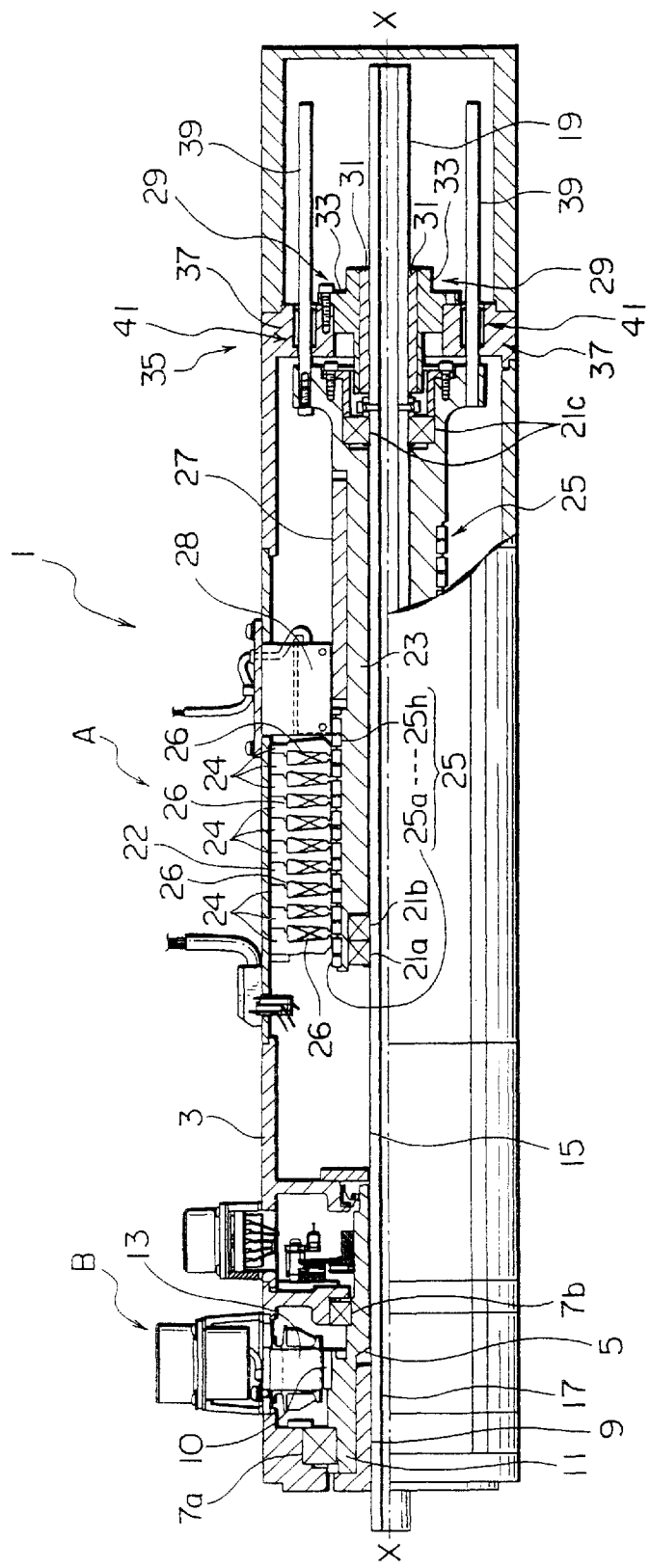
FIG. 1 is a partly sectional view showing an embodiment of a linear/rotary actuator according to the present invention, wherein an output shaft and a linear shaft each are vertically divided on a horizontal plane including an axis X—X and a rear portion of the actuator is sectioned.

Referring first to FIG. 1, an embodiment of a linear/rotary actuator according to the present invention is illustrated, wherein an output shaft and a linear shaft each are vertically divided on a horizontal plane including an axis X—X and a rear portion of the actuator is sectioned. A linear/rotary actuator of the illustrated embodiment which is generally designated at reference numeral 1 generally includes a linear motor A acting as a linear driving motor and a rotary driving motor B which are arranged in juxtaposition to each other in a manner to define an axis X—X of the linear/rotary actuator by cooperation with each other. In the illustrated embodiment, the rotary driving motor B is constituted by a servo motor and the linear driving motor A is constituted by a linear synchronous motor of the cylindrical type.

The linear/rotary actuator 1 of the illustrated embodiment includes a frame 3 having a forward cavity defined therein.

The rotary driving motor B has a drive section or rotary section positioned in the forward cavity of the frame 3 of the linear/rotary actuator 1. The rotary driving motor B includes a rotor 5 including a revolving shaft 11 constructed into a hollow structure and having a spline nut (hereinafter referred to as "nut") 9 securely mounted therein. The rotor 5 also includes a plurality of permanent magnets 10 fixed on the revolving shaft 11. The rotary driving motor B further includes a stator 13 mounted on the frame 3. The revolving shaft 11 is rotatably supported on the frame 3 by means of a forward bearing structure constituted by two bearings 7a and 7b. The nut 9 is fitted on a forward spline section 17 formed on a forward portion of an output shaft 15 so as to extend over a predetermined length, to thereby permit the output shaft 15 to be slid in an axial direction or a direction of the axis X—X. The forward spline section 17 has a spline projection formed thereon so as to extend over a predetermined length in the axial direction and correspondingly the nut 9 is provided with an axially-extending groove, which is be fitted on the spline projection. The output shaft 15 is formed on a rearward portion thereof with a rearward spline section 19 so as to extend over a predetermined length in the axial direction. Thus, the output shaft 15 includes an intermediate section which is defined between the forward spline section 17 and the rearward spline section 19 or on which the spline sections 17 and 19 are not formed. The output shaft 15 is so arranged that the intermediate section is rotatably inserted through a linear shaft 23 of a cylindrical shape constituted by a movable element of the linear motor A by means of an intermediate bearing structure constituted by three bearings 21a, 21b and 21c. The bearings 21a to 21c each include an outer ring and an inner ring fixed on the linear shaft 23 and output shaft 15, respectively. The rearward spline section 19 is supported by a rearward bearing structure 29. The rearward bearing structure 29 is called a rotary-type spline nut and constructed so as to slide the rearward spline section 19 in the direction of the axis X—X and rotate the output shaft 15. More particularly, the rearward bearing structure 29 includes an outer ring 33 fixed on a fixing member 36 of a fixed section 35 securely fixed on the frame 3 and an inner ring 31 fixed on the rearward spline section 19. The inner ring 31 constitutes a nut which permits sliding of the rearward spline section 19 in the direction of the axis X—X.

The linear motor A which includes the linear shaft 23 acting as the movable element is received in the frame 3. The linear motor A is provided therein with a stator 22, which includes a plurality of split cores 24 and a plurality of exciting windings 26 each arranged between each adjacent two of the split cores 24. The linear motor A may be constructed in such a manner as disclosed in U.S. Ser. No. 09/520,741, therefore, it will not be more fully described.

The linear shaft 23 is provided on an outer surface thereof with a plurality of permanent magnet trains 25 constituted by a plurality of permanent magnets 25a to 25h in a manner to be spaced from each other at predetermined intervals. Between any adjacent two of the permanent magnet trains 25 is arranged a position detecting scale 27 for detecting a position of the linear motor A. The frame 3 is fixedly mounted thereon with a detection sensor 28 in a manner to positionally correspond to the position detecting scale 27. The linear shaft 23 is provided on a rearward portion thereof with a whirl-stop or detent mechanism 37 for preventing the linear shaft 23 from being rotated due to force transmitted thereto through the bearings 21a and 21b when the output shaft 15 is rotated by driving of the rotary driving motor B. The detent mechanism 37 is arranged between the linear shaft 23 and the fixed section 35 and constituted by four elongated bar-like members 39 each fixed at one end thereof to the linear shaft 23 and extending in a rearward direction or in a right-hand direction in FIG. 1 and four guide members 41 in which four such bar-like members 39 are fitted, respectively. The four guide members 41 are arranged on the fixing member 36 while being spaced from each other at equal intervals in a circumferential direction of the fixing member 36. The guide members 41 each are constituted by a bearing called an LM bushing which is provided therein with a ball bearing and constructed so as to slide the bar-like member 39 in the direction of the axis X—X.

Now, the manner of operation of the linear/rotary actuator 1 of the illustrated embodiment constructed as described above will be described with reference to FIG. 1.

In order to permit the linear/rotary actuator 1 to carry out only rotary motion, an exciting current is flowed through exciting windings of the stator 13 of the rotary driving motor B, to thereby rotate the revolving shaft 11. Such rotation of the revolving shaft 11 permits the nut 9 mounted in the revolving shaft 11 to rotate the output shaft 15. At this time, the linear shaft 23 is held stopped; however, the intermediate bearing structure constituted by the bearings 21a to 21c and the rearward bearing structure 29 are rendered rotatable, leading to rotation of the output shaft 11.

In order to permit the linear/rotary actuator 1 to carry out only linear motion, an exciting current is flowed through the exciting windings 26 of the stator 22 of the linear motor A. Then, a direction in which the exciting current is flowed through the exciting windings 26 is shifted in order, resulting in thrust for displacing the linear shaft 23 in the direction of the axis X—X being generated between the permanent magnets 25a to 25h of the permanent magnet train 25 of the linear shaft 23 and magnetic poles on a side of the stator. Thus, the output shaft 15 carries out linear motion with movement of the linear shaft 23.

In order to permit the linear/rotary actuator 1 to carry out both linear motion and rotary motion concurrently, a current is flowed through the exciting windings 26 of the stator 22 of the linear motor A and the windings of the stator of the rotary driving motor B concurrently. This results in the output shaft 15 being independently rotated and the linear shaft 23 carrying out linear motion independently from a rotational speed of the output shaft 15. Thus, the linear/rotary actuator 1 of the illustrated embodiment permits linear motion and rotary motion to be concurrently carried out as desired while preventing one of the motions from affecting the other motion. Synchronism between the linear motion and the rotary motion may be carried out by mounting a rotation detector (encoder) on the rotary driving motor to render both motions electrically synchronized with each other depending on an output of the rotation detector.

Figure 2:
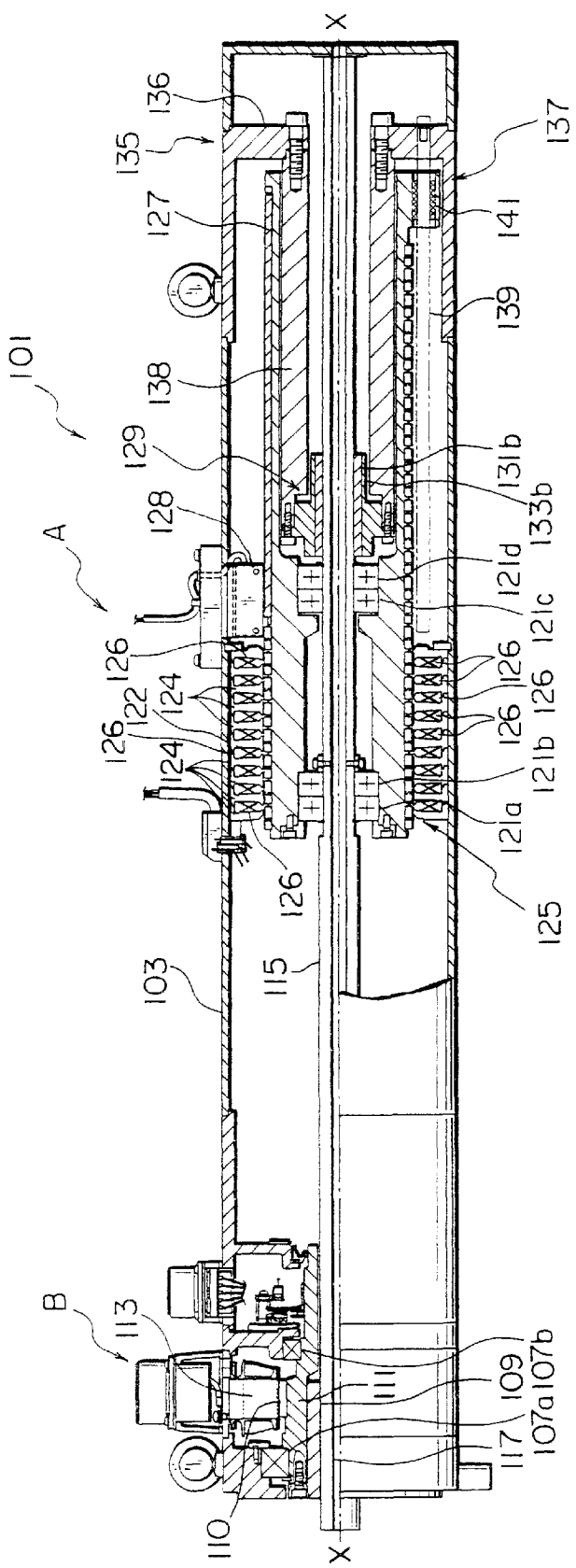
FIG. 2 is a partly sectional view showing another embodiment of a linear/rotary actuator according to the present invention, wherein an output shaft and a linear shaft each are vertically divided on a horizontal plane including an axis X—X and a rear portion of the actuator is sectioned.
Figure 3:
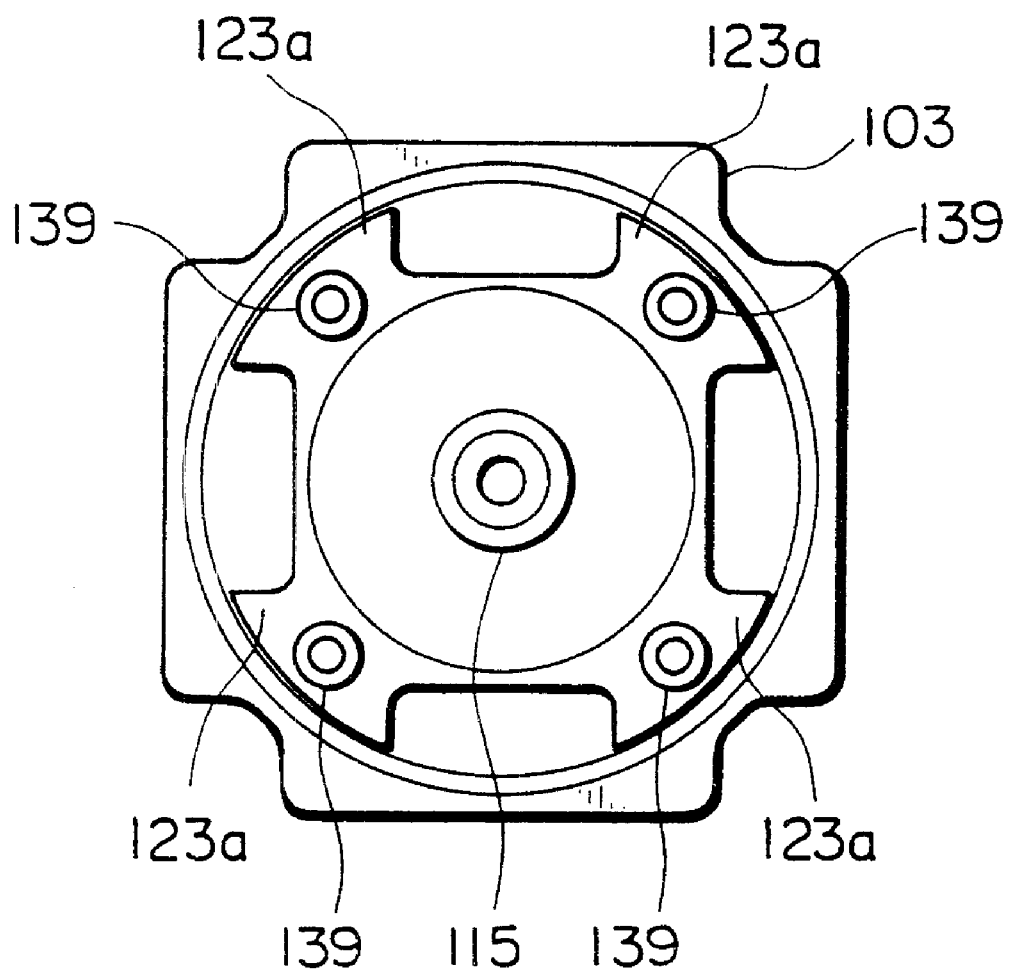
FIG. 3 is a side elevation view of the linear/rotary actuator shown in FIG. 2.

Referring now to FIGS. 2 and 3, another embodiment of a linear/rotary actuator according to the present invention is illustrated, wherein an output shaft and a linear shaft each are vertically divided on a horizontal plane including an axis X—X and a rear portion of the actuator is sectioned as in the first embodiment described above. In connection with the illustrated embodiment, reference numerals correspond to those discussed in the embodiment described above, except with an additional prefix of 100.

A linear/rotary actuator 101 of the illustrated embodiment is different from the above-described embodiment in that bar-like members 139 and guide members 141 for holding the bar-like members 139 which cooperate with each other to constitute a detent mechanism 137 are arranged in a manner to be positionally contrary to those in the above-described embodiment and a rearward spline section 119 is arranged in a linear shaft 123 of a linear motor A.

In the illustrated embodiment, in order to more forwardly arrange a rearward bearing structure 129, a fixed section 135 is constituted by a body 136 for the fixed section 135 and a cylindrical member 138 fixed at a rearward end thereof to the fixed section body 136 and arranged so as to be concentric with the linear shaft 123 and an output shaft 115 and forwardly extend between the linear shaft 123 and the output shaft 115. The rearward bearing structure 129 is fixed to a forward end of the cylindrical member 138. In the illustrated embodiment, the detent mechanism 137 is constituted by four elongated bar-like members 139 fixed to the fixed section body 136 so as to forwardly extend and guide members 141 provided on the linear shaft 123 and fitted on the bar-like members 139. The guide member 141 is constructed so as to permit the linear shaft 123 to be slid in the direction of the axis X—X of the output shaft 115 but prevent the linear shaft 123 from being rotated about the output shaft 115.

The linear shaft 123, as shown in FIG. 3, includes four projections 123a arranged thereon so as to be spaced from each other at angular intervals of 90 degrees in a circumferential direction thereof and radially outwardly projected therefrom. Four such projections 123a each are mounted thereon with the guide member 141 commonly called an LM bushing. The guide members 141 each are fitted therein with the bar-like member 139 in a manner to be slidable therein. The cylindrical member 138 is formed into a length which permits an intermediate bearing structure constituted by bearings 121a to 121d and the rearward bearing structure 129 to be arranged in proximity to each other. Such configuration reduces a distance between the intermediate bearing structure and the rearward bearing structure 129 and permits the rearward bearing structure 129 to be arranged in the linear shaft 123, to thereby reduce a length of the output shaft 115, resulting in a whole length of the linear/rotary actuator 101 being reduced, so that the linear/rotary actuator may be constructed in a compact manner.

The above-described construction of each of the embodiments permits the linear/rotary actuator to carry out linear motion at a maximum speed of 2 m/sec.

Figure 4:
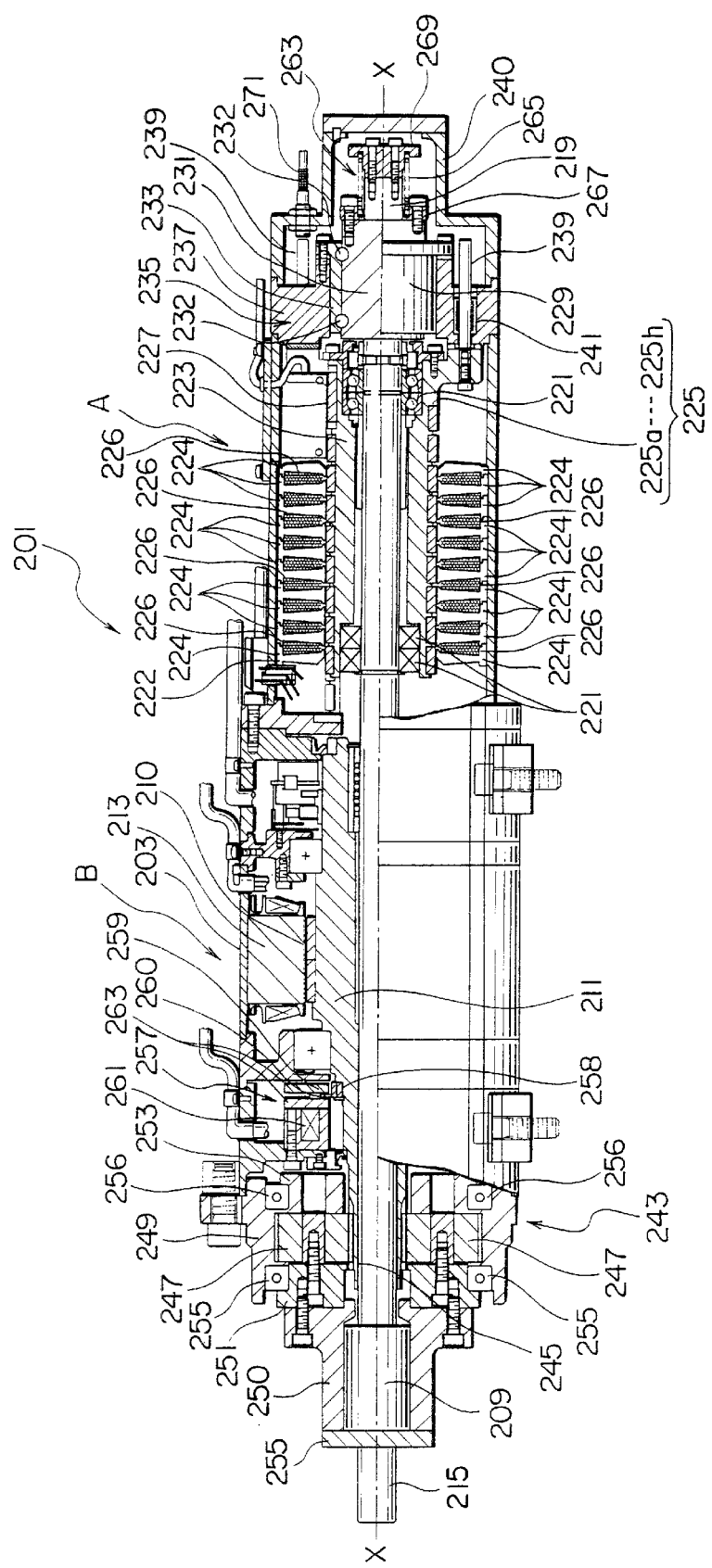
FIG. 4 is a partially sectional view showing a further embodiment of a linear/rotary actuator according to the present invention, wherein an output shaft and a linear shaft each are vertically divided on a horizontal plane including an axis X—X and a rear portion of the actuator is sectioned.

Referring now to FIG. 4, a further embodiment of a linear/rotary actuator according to the present invention is illustrated, wherein an output shaft and a linear shaft each are vertically divided on a horizontal plane including an axis X—X and a rear portion of the actuator is sectioned as in the first embodiment described above. In connection with the illustrated embodiment, reference numerals correspond to those discussed in the embodiment described above with reference to FIG. 1, except with an additional prefix of 200.

A linear/rotary actuator of the illustrated embodiment is different in configuration from that shown in FIG. 1 in that a reduction mechanism 243 is provided between a revolving shaft 211 and a nut 209 arranged separately from each other in an axial direction or a direction of the axis X—X, an electromagnetic brake mechanism 257 is located between a rotary driving motor B and the reduction mechanism 243 and a spring mechanism 263 is arranged on a rearward side of the linear/rotary actuator 201.

The reduction mechanism 243, as shown in FIG. 4, includes a central gear 245 formed on an outer periphery of a forward end of the revolving shaft 211 by machining, three epicyclic gears 247 meshed with the central gear 245 so as to be rotated around the central gear 245, an outer fixed gear 249 of a cylindrical shape formed on a central portion of an inner peripheral surface thereof with teeth engaged with the epicyclic gears 247 and fixed with respect to a frame 203, a forward rotator 251 of an annular shape arranged forwardly of the epicyclic gears 247 and having a revolving shaft of each of the epicyclic gears 247 rotatably fixed therein, a rearward rotator 253 of an annular shape fixed rearwardly of the epicyclic gears 247 and rotated with the epicyclic gears 247, a flanged cylindrical member 250 fixed on the forward rotator 251, and a block plate 255 formed with a through-hole via which an output shaft 215 is inserted and arranged so as to block a forward open end of the cylindrical member 253. The forward rotator 251 and rearward rotator 253 are rotatably received through annular bearings 255 and 256 in a pair of openings formed on both sides of the outer fixed gear 249 in the axial direction, respectively.

When the rotary driving motor B is rotated to rotate the revolving shaft 211, the epicyclic gears 247 are rotated around the central gear 245 while revolving, so that the forward rotator 251 on which the epicyclic gears 247 are rotatably fixed and the cylindrical member 250 fixed on the rotator 251 may be rotated at a rotational speed smaller than that of the revolving shaft 211. Such rotation of the cylindrical member 250 permits the nut 209 fixedly fitted in the cylindrical member 250 to be rotated at a reduced rotational speed. Then, rotation of the nut 209 is transmitted from the nut 209 to the output shaft 215, resulting in the output shaft 215 being rotated at a reduced rotational speed.

The electromagnetic brake mechanism 257 is arranged between the rotary driving motor B and the reduction mechanism 243. The brake mechanism 257 includes a hub 259 securely mounted on the revolving shaft 211, exciting coils 261 fixed on a side of the frame 3 and a pair of brake pads 263 driven by the exciting coils 261, to thereby be contacted with the hub 259. The hub 259 is fixed in a hub press-in section provided on an outer periphery of the revolving shaft 211 through a key 258. The hub 259 includes a disc 260 arranged in a manner to be concentric with the revolving shaft 211 and located between the brake pads 263. The electromagnetic brake mechanism 257 acts to separate the brake pads 263 from each other when the exciting coils 261 are kept excited. When the exciting coil 261 is kept from being excited, the brake pads 263 are permitted to approach to each other, so that the disc 260 of the hub 259 may be sandwiched between the brake pads 263. This results in the electromagnetic brake mechanism 257 exhibiting an automatic braking action when a power failure occurs or a power switch is turned off.

The linear/rotary actuator 201 includes a rearward bearing mechanism 229 provided with an inner ring 231, which has a spring mechanism 263 fixed on a rearward end surface thereof. The spring mechanism 263 includes a coiled spring 265 which is normally kept compressed and end plates 267 and 269 respectively fixed on both ends of the coiled spring 265 defined in the axial direction. One end plate 267 is fixed to the inner ring 231 and the other end plate 269 is fixed to a rearward end surface of the output shaft 219. The rearward bearing mechanism 229 is constituted by an outer ring 233 fixed in a fixed section 235 and the above-described inner ring 231 arranged in the outer ring 233 through balls 232. The inner ring 231 is fitted therein with a rearward spline section, which is arranged on an outer periphery of the output shaft 219. The rearward spline section is constructed so as to permit movement of the output shaft 219 in the axial direction and be rotated with the output shaft 219. Forward movement of the output shaft 219 leads to further compression of the coiled spring 265 of the spring mechanism 263.

When the linear motor A is released from excitation, the output shaft 219 is forcibly moved in a rearward direction by elastic force of the coiled spring 265 of the spring mechanism 263. This permits the output shaft 219 to be rearwardly moved irrespective of a position of the linear/rotary actuator when a power failure occurs or a power switch is turned off.

Reference numeral 271 designates a proximity switch fixed on a cover member 240 so as to act to detect an axial position of a rearward end of a single bar-like member 239. The bar-like member 239 is fixed on a linear shaft 223 so as to rearwardly extend therefrom. Thus, when a position of the bar-like member 239 is accurately detected by the proximity switch 271 thus arranged, a specific position of the bar-like member 239 detected by the proximity switch 271 may be used as a position of an origin thereof, to thereby enhance positioning control of linear motion of the output shaft 215.

When the linear/rotary actuator 201 of the illustrated embodiment is to be operated to carry out only rotary motion, an exciting current is flowed through exciting windings of a stator 213 of the rotary driving motor B to rotate the revolving shaft 211. Such rotation of the revolving shaft 211 leads to rotation of the central gear 245 mounted on the revolving shaft 211, so that the forward rotator 251 of the reduction mechanism 243 on which the epicyclic gears 247 rotated around the central gear 245 are fixed may be rotated. This permits the output shaft 215 and the nut 209 connected to the forward rotator 251 by means of a cylindrical member 250 to be rotated, so that the linear/rotary actuator 201 may carry out rotary motion. Then, when feeding to the rotary driving motor B which is being fed from an exterior of the linear/rotary actuator 201 for operation is interrupted, the exciting coils 261 of the electromagnetic brake mechanism 257 are rendered non-excited, so that the electromagnetic brake mechanism 257 may carry out a braking action.

The illustrated embodiment, as described above, is so constructed that the reduction mechanism 243 is arranged between the revolving shaft 211 and the nut 209. Such construction reduces a rotational speed of the revolving shaft 211 to a predetermined level, to thereby permit the linear/rotary actuator 201 to carry out rotary motion at high torque. Also, the magnetic brake mechanism 257 is arranged between the rotary driving motor B and the reduction mechanism 243, to thereby apply braking force at a suitable level to the revolving shaft 211, resulting in facilitating control of rotary motion of the linear/rotary actuator 201.

As can be seen form the foregoing, the linear/rotary actuator of the present invention is configured to carry out rotary motion and linear motion either individually or concurrently as desired, resulting in being allocated to a variety of applications including a winding machine and the like.

Also, the linear/rotary actuator of the present invention carries out linear motion at a high speed, so that whole motion of the linear/rotary actuator may be attained at an increased speed.

Further, the linear/rotary actuator of the present invention may be reduced in dimension or size thereof in the axial direction and minimize generation of vibration during operation thereof.

Moreover, the linear/rotary actuator of the present invention permits a speed of rotary motion thereof to be freely controlled as desired, to thereby be allocated to various applications.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A linear/rotary actuator comprising:

a linear motor including a hollow linear shaft acting as a movable element;

an output shaft formed on forward and rearward portions thereof with forward and rearward spline sections each having a predetermined length, respectively;

said output shaft having an intermediate portion on which said forward and rearward spline sections are not formed, said intermediate portion of said output shaft being rotatably inserted through said linear shaft by means of an intermediate bearing structure;

a nut fitted on said forward spline section of said output shaft;

a rotary driving motor for rotating said nut either directly or through a transmission mechanism, to thereby rotate said output shaft; and a rearward bearing structure including a fixed section having said rearward spline section fixed thereto;

said rearward bearing structure supporting said rearward spline section so as to permit sliding of said rearward spline section in an axial direction of said actuator and rotation of said output shaft.

2. A linear/rotary actuator comprising:

a linear motor including a stator fixed on a frame and a hollow linear shaft acting as a movable element;

an output shaft formed on forward and rearward portions thereof with forward and rearward spline sections each having a predetermined length, respectively;

said output shaft having an intermediate portion on which said forward and rearward spline sections are not formed, said intermediate portion of said output shaft being rotatably inserted through said linear shaft by means of an intermediate bearing structure;

a nut fitted on said forward spline section of said output shaft and constructed so as to permit sliding of said forward spline section in an axial direction of said actuator;

a rotary driving motor including a revolving shaft configured into a hollow structure and having said nut fixed therein, a rotor fixed on said revolving shaft and a stator fixed on said frame;

a forward bearing structure for rotatably supporting said revolving shaft on said frame; and a rearward bearing structure including a fixed section fixed on said frame, an outer ring fixed on said fixed section and an inner ring fitted on said rearward spline section so as to permit sliding of said rearward spline section in the axial direction.

3. A linear/rotary actuator as defined in claim 2, further comprising at least one detent mechanism arranged between said linear shaft of said linear motor and said fixed section so as to prevent rotation of said linear shaft about said output shaft.

4. A linear/rotary actuator as defined in claim 3, wherein said rearward bearing structure is fixed to said fixed section arranged on a rearward side of said linear shaft; and said detent mechanism includes an elongated bar-like member fixed to said linear shaft so as to rearwardly extend therefrom and a guide member provided on said fixed section and fitted on said bar-like member;

said guide member being configured to permit sliding of said bar-like member in the axial direction and prevent rotation of said bar-like member about said output shaft.

5. A linear/rotary actuator as defined in claim 3, wherein said fixed section includes a fixed section body arranged on a rearward side of said linear shaft and a cylindrical member fixed at a rearward portion thereof to said fixed section body and arranged concentrically with said linear shaft and output shaft so as to forwardly extend between said linear shaft and said output shaft;

said rearward bearing structure is fixed on a forward end of said cylindrical member; and said detent mechanism includes an elongated bar-like member fixed to said fixed section body so as to forwardly extend therefrom and a guide member provided on said linear shaft and fitted on said bar-like member;

said guide member being configured to permit sliding of said linear shaft in the axial direction and prevent rotation of said linear shaft about said output shaft.

6. A linear/rotary actuator as defined in claim 5, wherein said cylindrical member is formed into a length which permits said intermediate bearing structure and rearward bearing structure to be arranged in proximity to each other.

7. A linear/rotary actuator as defined in claim 4, wherein a plurality of said detent mechanisms are arranged so as to be spaced from each other at equal intervals in a direction of rotation of said output shaft.

8. A linear/rotary actuator as defined in claim 4, further comprising a position sensor for detecting a position of a rearward end of said bar-like member.

9. A linear/rotary actuator as defined in claim 2, further comprising a spring mechanism for applying, to said output shaft, force which acts to rearwardly move said output shaft.

10. A linear/rotary actuator as defined in claim 5, wherein a plurality of said detent mechanisms are arranged so as to be spaced from each other at equal intervals in a direction of rotation of said output shaft.

11. A linear/rotary actuator comprising:

a linear motor including a stator fixed on a frame and a hollow linear shaft acting as a movable element;

an output shaft formed on forward and rearward portions thereof with forward and rearward spline sections each having a predetermined length, respectively;

said output shaft having an intermediate portion on which said forward and rearward spline sections are not formed, said intermediate portion of said output shaft being rotatably inserted through said linear shaft by means of an intermediate bearing structure;

a nut fitted on said forward spline section of said output shaft and constructed so as to permit sliding of said forward spline section in an axial direction of said actuator;

a rotary driving motor including a revolving shaft configured into a hollow structure and having said output shaft inserted therethrough, a rotor fixed on said revolving shaft and a stator fixed on said frame;

a reduction mechanism arranged between said revolving shaft and said nut to transmit rotation of said revolving shaft to said nut while reducing a speed of rotation of said revolving shaft;

a forward bearing structure for rotatably supporting said revolving shaft on said frame; and a rearward bearing structure including a fixed section fixed on said frame, an outer ring fixed on said fixed section and an inner ring fitted on said rearward spline section so as to permit sliding of said rearward spline section in the axial direction.

12. A linear/rotary actuator as defined in claim 11, wherein said reduction mechanism is constituted by an epicyclic gear mechanism including a rotator;

said rotator including a central gear provided on said revolving shaft and epicyclic gears fixed on said rotator so as to be rotated about said central gear;

said rotator being coupled to said nut;

said rotator being rotatably supported on said frame through a bearing structure.

13. A linear/rotary actuator as defined in claim 12, further comprising an electromagnetic brake mechanism including exciting coils and arranged between said rotary driving motor and said reduction mechanism;

said electromagnetic brake mechanism carrying out non-braking operation when said exciting coils are kept excited and braking operation when said exciting coils are kept nonexcited;

said exciting coils being rendered nonexcited when feeding to said rotary driving motor is interrupted.

* * * * *